7620X
D. G. COLBURN.
Revolver.
2 Sheets—Sheet 1.
Patented June 29, 1833.
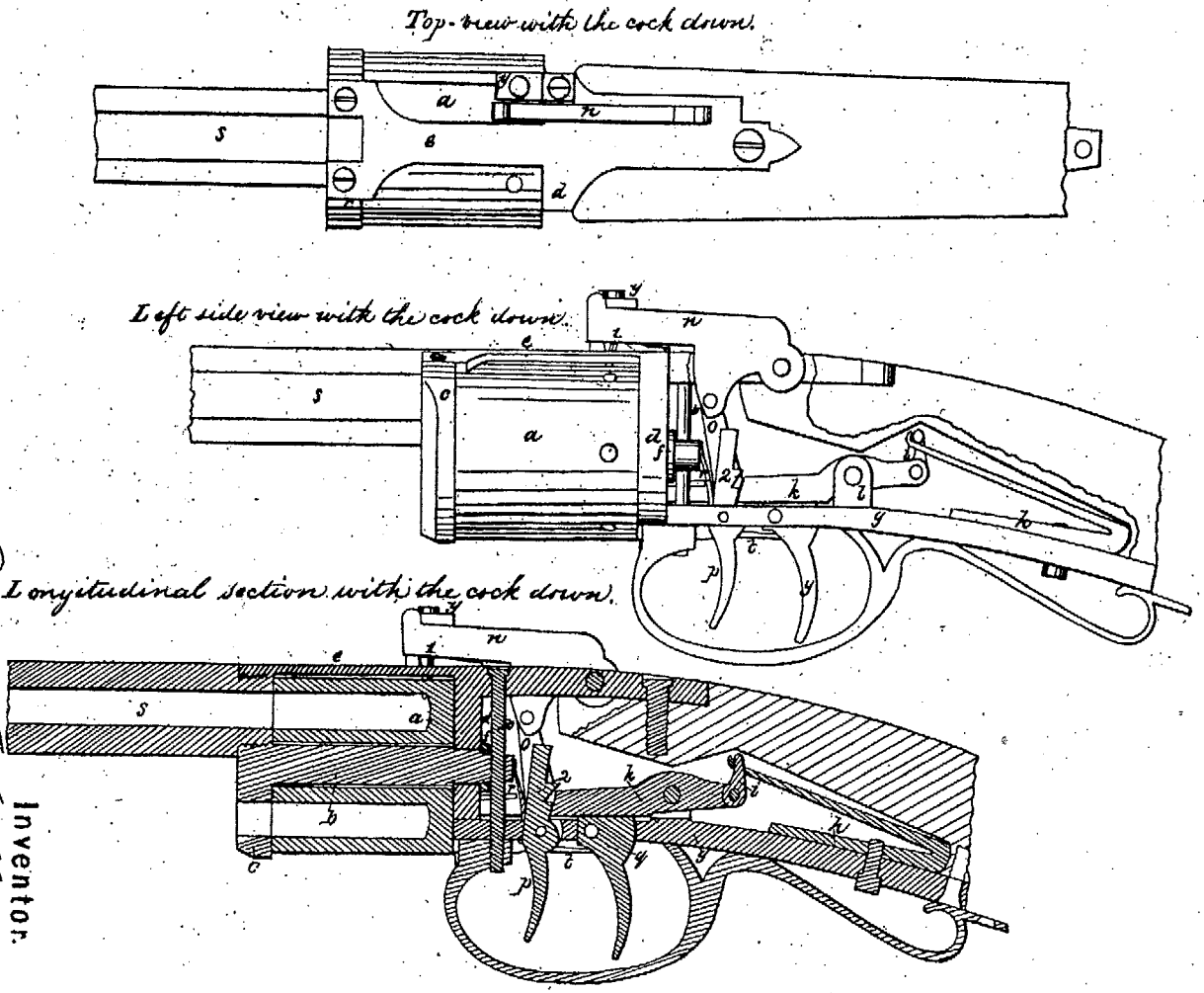
Inventor.
David G. Colburn 7620X
2 Sheets—Sheet 2.
D. G. COLBURN.
Revolver.
Patented June 29, 1853.
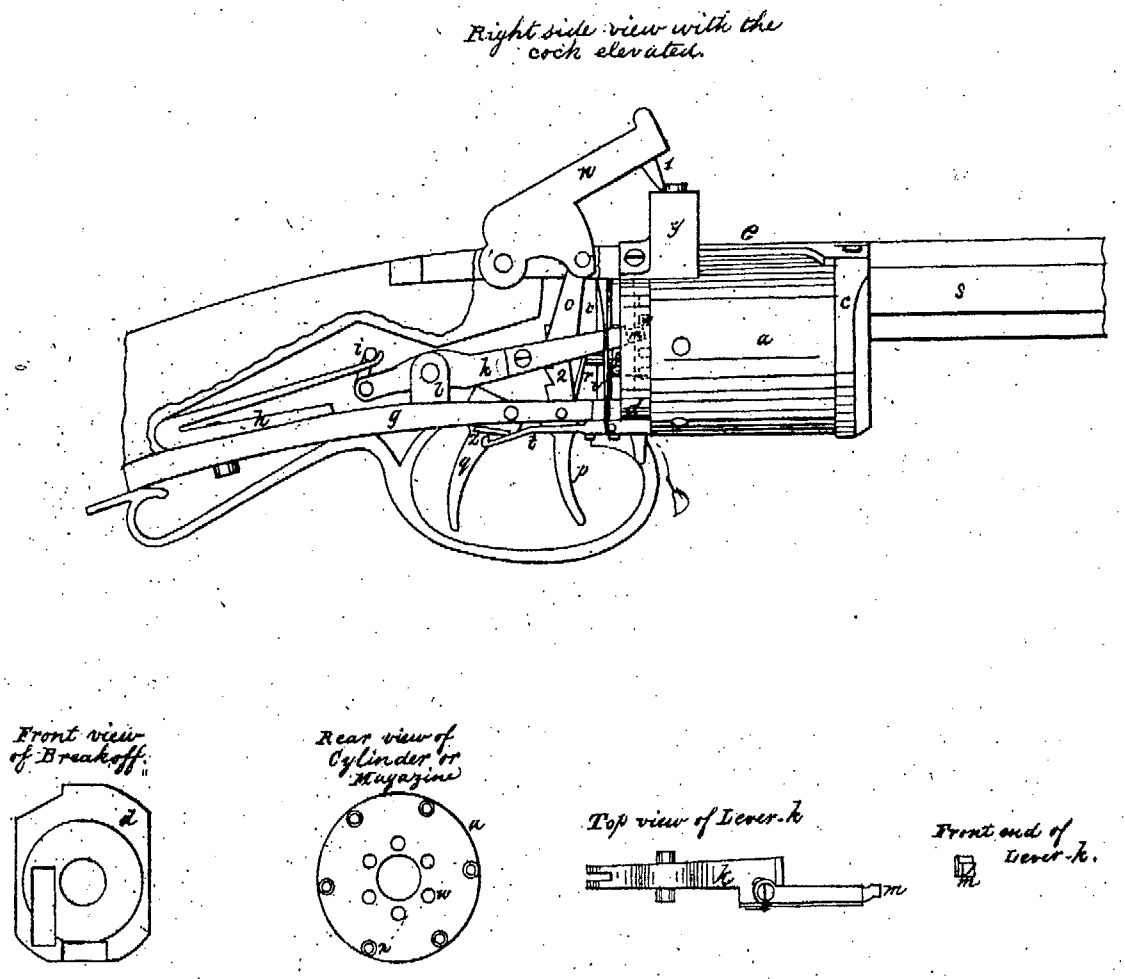
Inventor.
David G. Colburn

7620X

UNITED STATES PATENT OFFICE.

DAVID G. COLBURN, OF CANTON, VAN BUREN, NEW YORK.

IMPROVEMENT IN GUNS.

Specification forming part of Letters Patent dated June 29, 1833.

*To all whom it may concern:*

Be it known that I, DAVID G. COLBURN, of the village of Canton, town of Van Buren, county of Onondaga, and State of New York, have invented a new and useful Improvement in Guns; and I do hereby declare that the following is a full and exact description of the construction and operation of the said machine as invented by me.

The improvement is made to shoot from three to twelve times at once, loading by means of a cylinder or magazine, which turns on an arbor passing from the collar through to the break-off, receiving the cross-pin through it to keep it firm, a strap running from the break-off to the collar in front of the magazine, and fastened with two screws, a nut on the arbor to screw up the magazine to the collar, the trigger-plate to be fastened on the bottom of the break-off on the front, and on the back on the stock of the gun, the mainspring on the back part of the trigger-plate pointing forward and hanging to the lever with a link, the lever hung in a post in the trigger-plate pointing forward to the magazine, with a spring-catch that points up when cocked and turns the magazine and cocks the lock and primes the same time by a small magazine on the top of the break-off. The cock hangs in the break-off with a link down to the lever. The sear is the front trigger, hanging in the trigger-plate and catching under the forward part of the lever. The cocking-trigger is behind the front trigger under the lever. To cock the gun by pulling the back trigger back and turning the magazine and priming at the same time, a slide under the trigger-plate to shove forward or back by a spring attached to the trigger, or by the finger when the magazine has rolled far enough, brings a charge before the barrel, which is attached to the collar, so that, pulling the back trigger, it will, after the magazine is charged, cock the lock, roll the magazine to its place, and prime at the same time, ready for a discharge; and it is to be used for rifles, pistols, or fowling-pieces, and is to be used with one or two barrels. With one barrel used the above-described lock, and when two barrels are used the one of the barrels must be attached to the collar beside the other, with the addition of a side lock made to go on the side of the gun, the plate from two to four inches long and from one-half to one and a half wide, the cock to be made to go through the plate, with a peak from one-half to one and a half of an inch long, the mainspring to hang on the back part of the plate, pointing forward and hanging to the cock, with a link, with a post in the back part of the plate, and a slide passing through and shoving the peak of the cock forward to cock it with the back trigger, or to cock by the forward trigger coming against the peak of the cock; and in cocking with the forward trigger the sear projects back to the back parts of the plate and falls off with the back trigger. The lock is to be used on rifles, fowling-pieces, and pistols, and the first-described to be used with or without the last.

What I claim as my own invention is—

All of the locks, and cocking and turning the magazine and priming at the same time by pulling the trigger.

DAVID G. COLBURN.

Witnesses:

WILL HEBB,

NORMAN DURKE.